(No Model.)

R. W. THOMPSON.
GROOMING GLOVE.

No. 277,173. Patented May 8, 1883.

WITNESSES:
Jno. F. Bourke
Thos. R. Bourke

Robt. W. Thompson, INVENTOR,
BY Geo. C. Tracy & Co., ATTORNEYS

UNITED STATES PATENT OFFICE.

ROBERT W. THOMPSON, OF EAST ROCKPORT, ASSIGNOR OF ONE-HALF TO EDWARD H. SAXTON, OF CLEVELAND, OHIO.

GROOMING-GLOVE.

SPECIFICATION forming part of Letters Patent No. 277,173, dated May 8, 1883.

Application filed December 16, 1882. (No model.)

*To all whom it may concern:*

Be it known that I, ROBERT W. THOMPSON, of East Rockport, county of Cuyahoga, and State of Ohio, have invented a new and useful Improvement in Gloves for Grooming Purposes; and I do hereby declare that the following is a full, clear, and exact description of the same, reference being made to the accompanying drawings, and to letters of reference marked thereon.

My invention relates to certain improvements in devices for grooming or cleaning horses and other animals, and has for its object the production of a curry-comb, brush, or like article in connection with a glove or shield for the hand, so that the device may be used with much greater facility and comfort than the old methods of using a flat brush, which is difficult to hold in the hand, especially in cold weather, and does not permit of being turned or bent to conform it to the irregularities of form of the animal. In my device these objections are overcome, and a grooming glove or mitten is produced which is comfortable to wear, and allows as much freedom of manipulation as can be gained from the individual use of the fingers, each being provided with bristles, teeth, or other equivalent material for performing the cleansing or grooming process.

Figure 1:
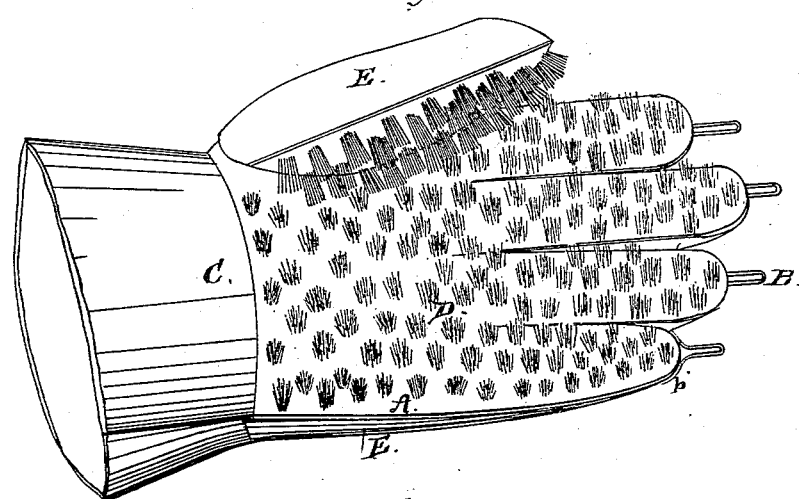
Figure 2:
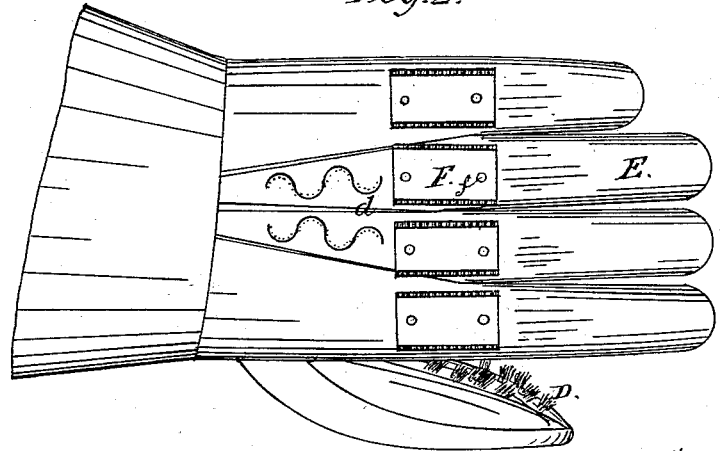
Figure 3:
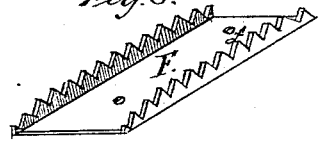

In the drawings, Figure 1 is a view of the palm or under side of a glove of this description provided with bristles. Fig. 2 is a top or back view of the same. Fig. 3 shows the serrated teeth or comb which is attached to the back of the fingers, and Fig. 4 a prong or projection to be fastened to the ends of the glove-fingers.

In the palm of Fig. 1 are the bristles or brushes *a a*, fastened in place by any suitable means, either through the fabric of the glove or upon separate pieces attached to each finger and the palm.

*b b* are wire loops or prongs, which may be attached to the ends of the fingers for the purpose of reaching in crevises or parts like the hoof, which do not admit of being reached in other ways. It will be readily seen that this conformation permits the glove to grasp the leg or any part of the animal and adapt itself to any irregularity, size, or shape, thus performing its work much better than is possible with the old form of brush.

At *d*, Fig. 2, are shown the plates of metal, made in the shape shown in Fig. 3, which are fastened to the back of the fingers, so that they are ready for immediate employment when the hand is turned as may be required.

Figure 4:
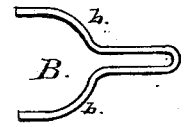

The prong, Fig. 4, is to be fastened in the ends of the fingers, as shown in Fig. 1, and may be so placed or not, as desired, as I do not limit myself narrowly to the glove in the exact form herein described; but any glove of flexible material having attached thereto brushes, bristles, or like materials for the purposes of grooming or cleaning animals will be clearly within the scope of my invention; and,

Having thus described the same, what I claim as new, and desire to secure by Letters Patent, is—

1. A flexible glove for grooming purposes, provided with bristles on its palm, substantially as and for the purposes described.

2. A flexible glove having teeth secured to it, substantially in the manner and for the purposes described.

3. The within-described flexible glove having bristles secured to its palm, provided with teeth upon its back, and having wire loops secured to the end of each finger, substantially as and for the purposes set forth.

This specification signed and witnessed this 17th day of October, 1882.

ROBERT W. THOMPSON.

Witnesses:
GEO. C. TRACY,
JNO. T. BOURKE.